US012710339B2

(12) United States Patent
Horii et al.

(10) Patent No.: US 12,710,339 B2
(45) Date of Patent: Aug. 18, 2026

(54) CELL COLLECTION METHOD

(71) Applicant: Sinfonia Technology Co., Ltd., Tokyo (JP)

(72) Inventors: Daichi Horii, Tokyo (JP); Haruki Takeuchi, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 1015 days.

(21) Appl. No.: 17/940,555

(22) Filed: Sep. 8, 2022

(65) Prior Publication Data

US 2023/0086690 A1 Mar. 23, 2023

(30) Foreign Application Priority Data

Sep. 10, 2021 (JP) ................................ 2021-148107

(51) Int. Cl.
*G01N 1/14* (2006.01)

(52) U.S. Cl.
CPC .................................... *G01N 1/14* (2013.01)

(58) Field of Classification Search
None
See application file for complete search history.

(56) References Cited

U.S. PATENT DOCUMENTS 10,793,822 B2 * 10/2020 Sasayama ................ C12M 1/10
11,254,902 B2 * 2/2022 Wang ..................... C12M 41/46
2003/0040104 A1 * 2/2003 Barbera-Guillem ... C12M 23/48 435/286.2
2009/0203063 A1 * 8/2009 Wheeler ................ C12M 25/01 435/395
2009/0220561 A1 * 9/2009 Jin ......................... A61L 27/56 435/402
2013/0109086 A1 * 5/2013 Kobayashi ............. C12M 47/02 435/297.1
2017/0191019 A1 * 7/2017 Kawarai ................ C12M 33/00
2018/0066218 A1 * 3/2018 Koike ...................... C12M 1/32
2018/0148680 A1 * 5/2018 Sasayama .............. C12M 29/04
2019/0203165 A1 * 7/2019 Wang ..................... C12M 41/46
2020/0354662 A1 * 11/2020 Suenaga ................ C12M 23/50

(Continued)

FOREIGN PATENT DOCUMENTS

WO 2020255930 A1 12/2020

OTHER PUBLICATIONS

Europe Patent Application No. 22194612.2, Extended European Search Report, dated Jan. 31, 2023.

(Continued)

*Primary Examiner* — Brian R Gordon
(74) *Attorney, Agent, or Firm* — Kilpatrick Townsend & Stockton LLP

(57) ABSTRACT

A cell collection method of collecting cells includes a culture medium movement process, a detachment liquid supply process, and a mixing process, wherein in the culture medium movement process, a used culture medium in a culture container is moved to a collection container, wherein in the detachment liquid supply process after the culture medium movement process, a detachment liquid for detaching the cells from an inner surface of the culture container is supplied to the culture container, and wherein in the mixing process after the detachment liquid supply process, the detachment liquid and the used culture medium are mixed with each other.

12 Claims, 15 Drawing Sheets

(56) References Cited

U.S. PATENT DOCUMENTS

| | | | | |
|---|---|---|---|---|
| 2021/0032580 | A1* | 2/2021 | Kojima | C12M 3/00 |
| 2021/0269761 | A1* | 9/2021 | Zantl | C12M 23/34 |
| 2021/0348102 | A1* | 11/2021 | Zhang | C12M 25/14 |
| 2022/0356437 | A1* | 11/2022 | Horii | C12N 5/0606 |
| 2023/0087656 | A1* | 3/2023 | Afshar | C12M 23/42 435/289.1 |
| 2023/0295555 | A1* | 9/2023 | Yamauchi | C12M 37/02 435/297.1 |
| 2023/0323269 | A1* | 10/2023 | Igarashi | C12M 33/04 435/297.1 |
| 2024/0060029 | A1* | 2/2024 | Deguchi | C12M 27/10 |
| 2024/0132821 | A1* | 4/2024 | Igarashi | C12M 33/00 |
| 2024/0191169 | A1* | 6/2024 | Deguchi | C12M 33/00 |
| 2024/0228928 | A9* | 7/2024 | Igarashi | C12M 33/00 |
| 2024/0384223 | A1* | 11/2024 | Yamauchi | C12M 33/00 |
| 2025/0051719 | A1* | 2/2025 | Chastagnier | C12M 25/14 |

OTHER PUBLICATIONS

Corning Incorporated, "Corning HYPERStack Cell Culture Vessel Closed System", 2016, Internet <URL: https://www.corning.com/catalog/cls/documents/selection-guides/CLS-AN-364%20DL%20HYPERStack%20User%20Guide.pdf >.

* cited by examiner

CELL COLLECTION METHOD

CROSS-REFERENCE TO RELATED APPLICATION

This application is based upon and claims the benefit of priority from Japanese Patent Application No. 2021-148107, filed on Sep. 10, 2021, the entire contents of which are incorporated herein by reference.

TECHNICAL FIELD

The present disclosure relates to a cell collection method of collecting cells cultured in a container containing a liquid culture medium and adhering to an inner surface of the container.

BACKGROUND

When cells are cultured in a culture container containing a liquid culture medium, the cells generally proliferate while adhering to an inner surface of the culture container. Therefore, when collecting cultured cells, it is necessary to detach the cells from the inner surface of the culture container. To that end, first, the used culture medium is generally discharged from the culture container. Thereafter, as described in, for example, Non-Patent Document 1, cells can be detached from the inner surface of the culture container by supplying a detachment liquid to the culture container. When the cells are immersed in the detachment liquid for a long time, the cells may be damaged by the detachment liquid. Therefore, such a reaction by the detachment liquid is stopped (that is, the detachment liquid is inactivated) by mixing a suspension containing the detachment liquid and the cells with a fresh culture medium.

PRIOR ART DOCUMENT

Non-Patent Document

Non-Patent Document 1: Corning Incorporated, "Corning Hyper Stack Cell Culture Vessel Closed System," [online], 2016 (Heisei 28), Corning Incorporated, [searched on Jul. 27, 2021], Internet <URL: https://www.corning-.com/catalog/cls/documents/selection-guides/CLS-AN-364%20DL%20HYPERStack%20User%20Guide.pdf>

In recent years, culturing a large number of cells using a large-scale facility has been studied. When a large number of cells need to be collected, the method of inactivating the detachment liquid using the fresh culture medium as described above consumes a large amount of fresh culture medium. Therefore, the cost may become remarkably high.

SUMMARY

The present disclosure provides a technique capable of suppressing an increase in cost while suppressing cell damage when cultured cells are collected by detaching the cells from a culture container with a detachment liquid.

A first aspect of the present disclosure is directed to a cell collection method, which collects cells cultured in a culture container containing a liquid culture medium and adhering to an inner surface of the culture container, including: a culture medium movement process of moving a used culture medium in the culture container to a predetermined reservoir after the cells are cultured; a detachment liquid supply process of, after the culture medium movement process, supplying a detachment liquid for detaching the cells from the inner surface of the culture container to the culture container; and a mixing process of, after the detachment liquid supply process, mixing at least a part of the detachment liquid and the used culture medium.

When the cells are immersed in the detachment liquid for a long time, the cells may be damaged by the detachment liquid. In the present disclosure, the used culture medium used for culturing the cells can at least dilute the detachment liquid. Moreover, when the used culture medium contains a component that inactivates the detachment liquid, it is possible to inactivate the detachment liquid. Thus, the damage to the cells caused by the detachment liquid can be suppressed without having to use a fresh culture medium. Therefore, when detaching and collecting the cultured cells from the culture container by the detachment liquid, it is possible to suppress the increase in cost while suppressing the damage to the cells.

A second aspect of the present disclosure is directed to the cell collection method of the first aspect, wherein the reservoir includes a collection container for collecting the cells, and wherein in the mixing process, a suspension in which the detachment liquid and the cells are mixed is moved from the culture container to the collection container.

In the mixing process, the used culture medium may be moved from the reservoir to the culture container. In this case, in order to collect the suspension of the used culture medium and the cells, it is necessary to perform a process of moving the suspension from the culture container to the collection container. In the present disclosure, the mixing process also serves as a process of moving the cells to the collection container (i.e., a collection process). This makes it possible to suppress an increase in the number of processes.

A third aspect of the present disclosure is directed to the cell collection method of the first or second aspect, wherein the reservoir includes a predetermined first reservoir and a second reservoir different from the first reservoir, wherein the culture medium movement process includes: a first culture medium movement process of moving a first used culture medium, which is a part of the used culture medium, from the culture container to the first reservoir; and a second culture medium movement process of moving a second used culture medium, which is another part of the used culture medium different from the first used culture medium, from the culture container to the second reservoir, wherein in the mixing process, the suspension in which the detachment liquid and the cells are mixed is moved from the culture container to the first reservoir, and wherein the cell collection method further comprises a return process of, after the mixing process, moving the second used culture medium from the second reservoir to the culture container.

When the suspension is moved to the first reservoir in the mixing process, some of the cultured cells may remain in the culture container. In the present disclosure, some of the cells remaining in the culture container can be mixed with the second used culture medium returned to the culture container in the return process. Thus, a part of the cells can be collected together with the second used culture medium. Therefore, it is possible to improve a collection rate of the cells while suppressing an increase in cost.

A fourth aspect of the present disclosure is directed to the cell collection method of the first aspect, wherein the cell collection method further comprises, between the detachment liquid supply process and the mixing process: a detachment liquid discharge process of discharging the detachment liquid from the culture container before the cells are completely detached from the inner surface of the culture container; and a waiting process of waiting for a predetermined period of time after the detachment liquid discharge process in a state in which a part of the detachment liquid remains in the culture container, and wherein in the mixing process, the used culture medium is moved from the reservoir to the culture container.

When the detachment liquid is discharged from the culture container before the cells are completely detached from the inner surface of the culture container, it is general that the cells and a small amount of detachment liquid remain in the culture container. By waiting for a predetermined period of time in such a state, it is possible to completely detach the cells from the inner surface of the culture container while minimizing damage to the cells which may be caused by the detachment liquid. Furthermore, by moving the used culture medium to the culture container in the mixing process, the cells can be suspended in the used culture medium in the culture container. Therefore, for example, even when the cells are ones that can be easily damaged by the detachment liquid, the cells can be collected while suppressing the damage to the cells as much as possible.

A fifth aspect of the present disclosure is directed to the cell collection method of any one of the first to fourth aspects, wherein the reservoir includes a collection container for collecting the cells, and wherein a temperature in a space in which the collection container is disposed is maintained to be lower than a temperature in a space in which the culture container is disposed.

In general, cells are likely to be activated and deteriorate in warm places. In this regard, according to the present disclosure, the temperature in the collection container can be maintained to be lower than the temperature in the culture container. Therefore, as compared with a case where the temperature in the collection container is high, deterioration of the cells collected in the collection container can be suppressed and the cells can be preserved for a long time.

BRIEF DESCRIPTION OF DRAWINGS

The accompanying drawings, which are incorporated in and constitute a part of the specification, illustrate embodiments of the present disclosure.

FIG. 2 is a flowchart showing a procedure of the cell collection method.

FIG. 10 is a flowchart showing a procedure of a cell collection method according to another modification.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

First Embodiment

Next, a first embodiment of the present disclosure will be described. For the sake of convenience of explanation, the up-down direction on the paper surface of FIG. 1 is defined as an up-down direction (vertical direction in which gravity acts).

(Outline of Cell Culture System)

An outline of a cell culture system 1 for carrying out a cell collection method according to a first embodiment will be described with reference to FIG. 1. FIG. 1 is a schematic front view showing the cell culture system 1. In FIG. 1, there is shown the cell culture system 1 in a state just before cells 13 are harvested (collected) after the below-described culture of the cells 13 is completed.

Figure 1:
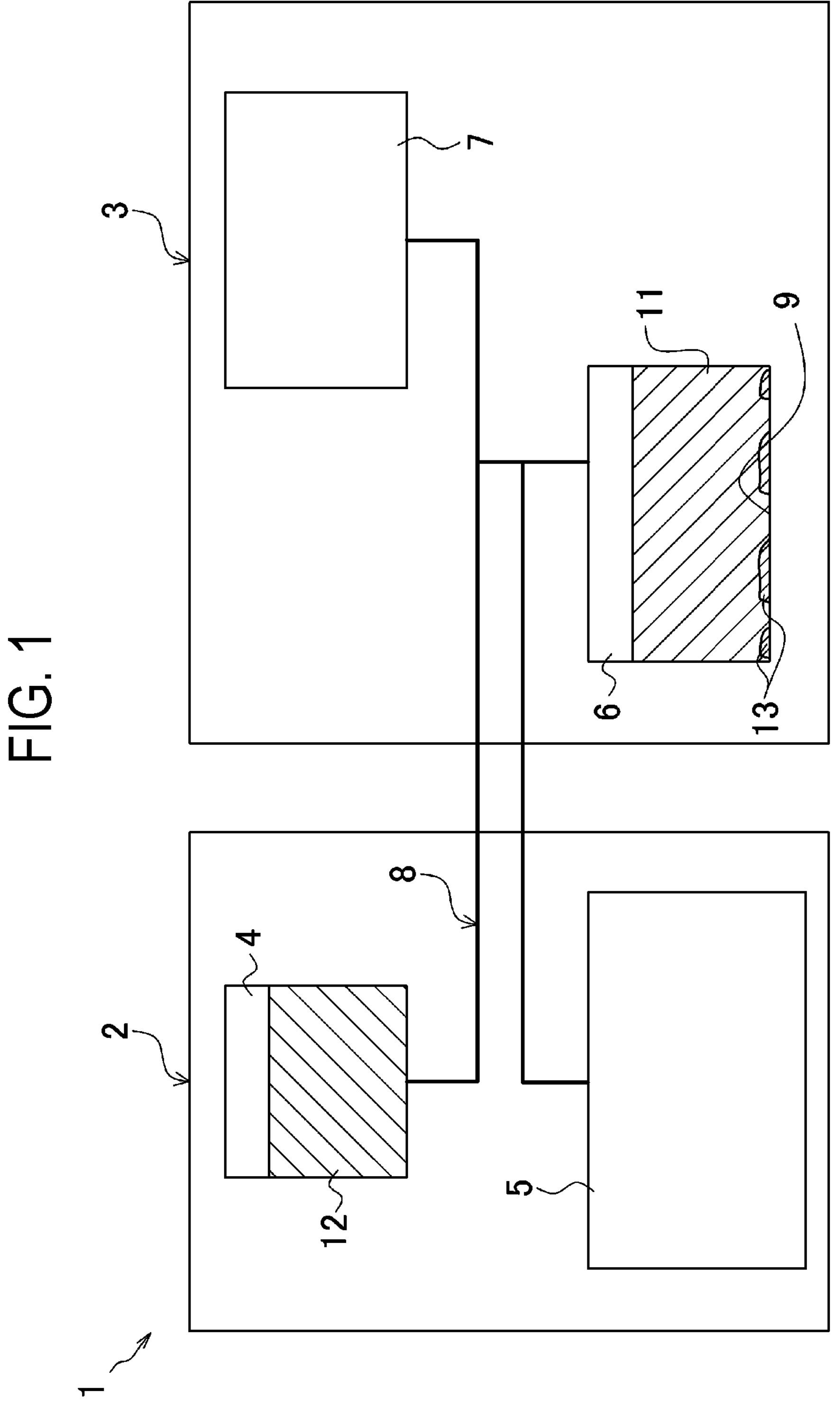
FIG. 1 is a schematic diagram showing a cell culture system for carrying out a cell collection method according to a first embodiment.

As shown in FIG. 1, the cell culture system 1 includes a refrigerator 2 constituting a low temperature area, and an incubator 3 constituting a culture area. The refrigerator 2 is a device for storing various reagents while suppressing changes in components of the reagents. The incubator 3 is a device for culturing the cells 13, which will be described later. Types of the cells 13 to be cultured include, but are not limited to, mesenchymal stem cells (MSC), induced pluripotent stem cells (iPSC), and the like.

The refrigerator 2 is configured to be capable of maintaining a temperature of the low temperature area at about 4 degrees C. As a result, the various reagents can be stored in the refrigerator 2 while suppressing changes in the components of the reagents. The refrigerator 2 may be configured to adjust the temperature of the low temperature area to a temperature other than about 4 degrees C. The refrigerator 2 has a door (not shown) that can be opened and closed. The refrigerator 2 accommodates at least a detachment liquid storage container 4 and a collection container 5 (reservoir of the present disclosure) therein. The detachment liquid storage container 4 is a container for storing a detachment liquid 12 to be described later. The collection container 5 is a container for collecting the cultured cells 13. In addition, the refrigerator 2 may accommodate, for example, a container (not shown) for storing a liquid culture medium (not shown) used for culturing the cells 13.

Figure 7A:
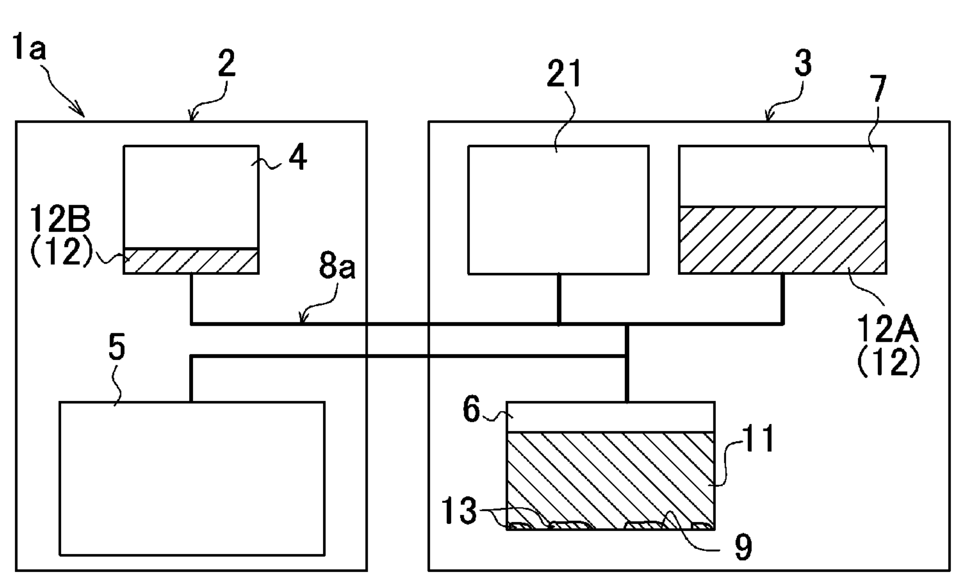
FIGS. 7A and 7B are explanatory diagrams showing parts of the procedure of the cell collection method.
Figure 7B:
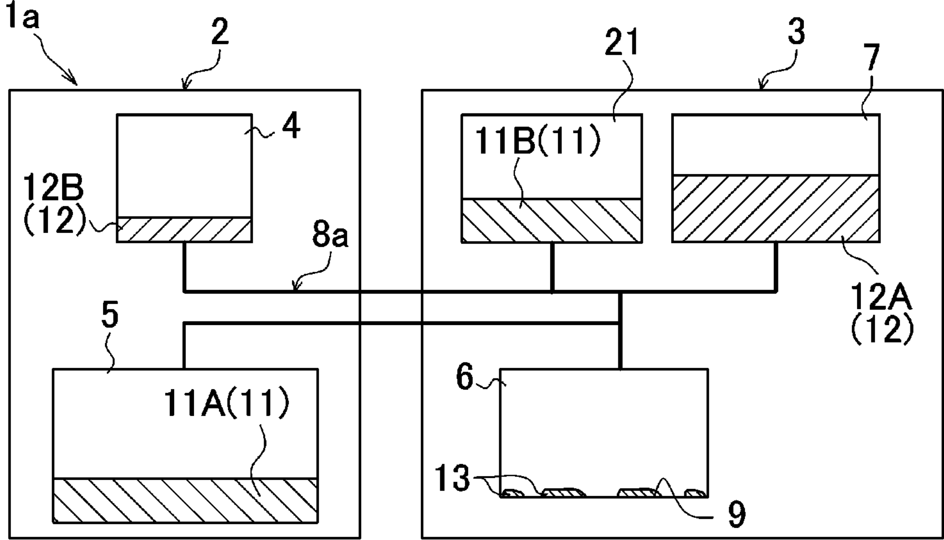
Figure 8A:
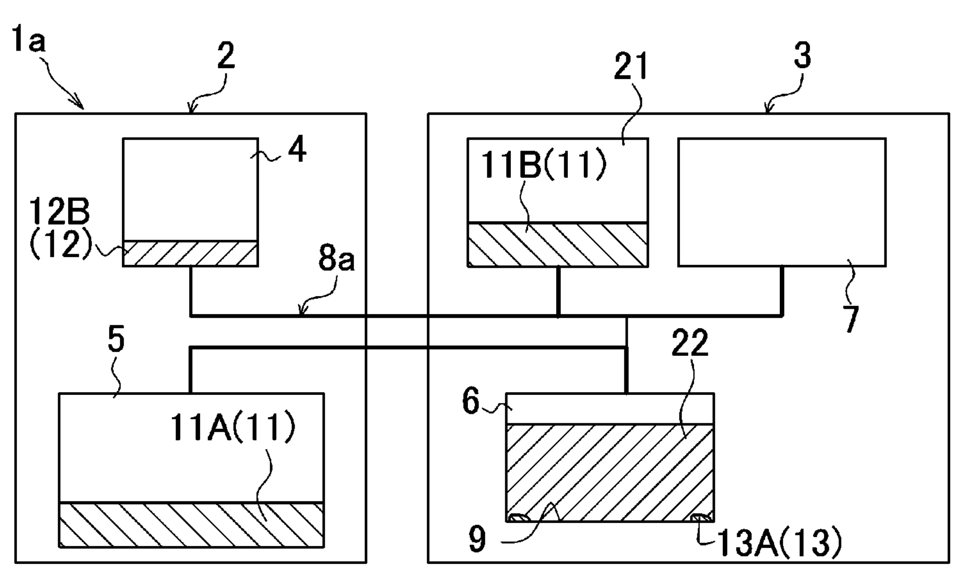
FIGS. 8A and 8B are explanatory diagrams showing parts of the procedure of the cell collection method.
Figure 8B:
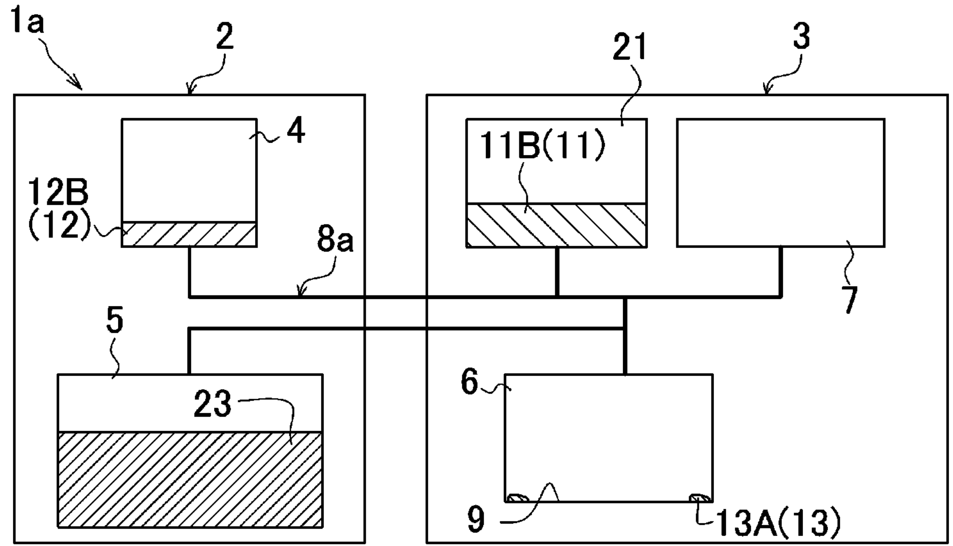
Figure 9A:
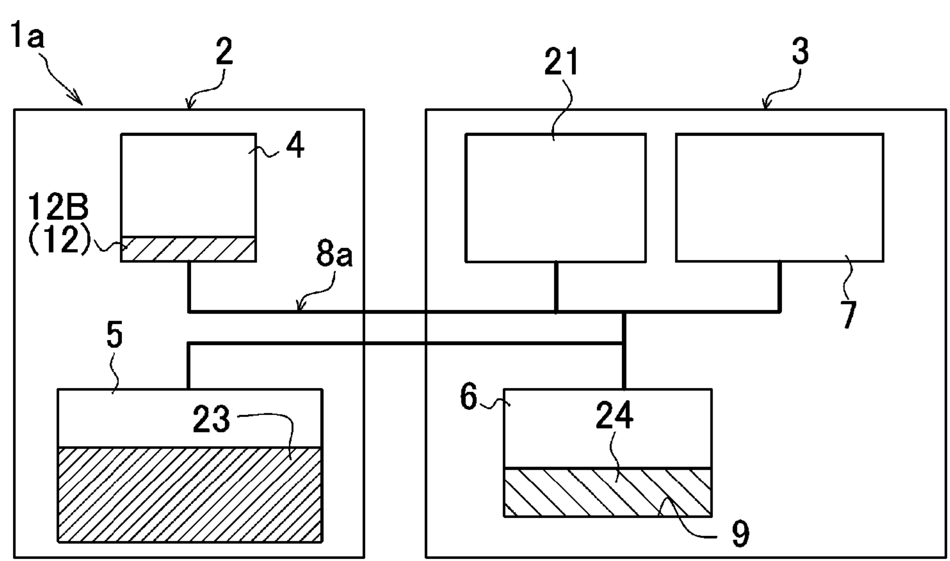
FIGS. 9A and 9B are explanatory diagrams showing parts of the procedure of the cell collection method.
Figure 9B:
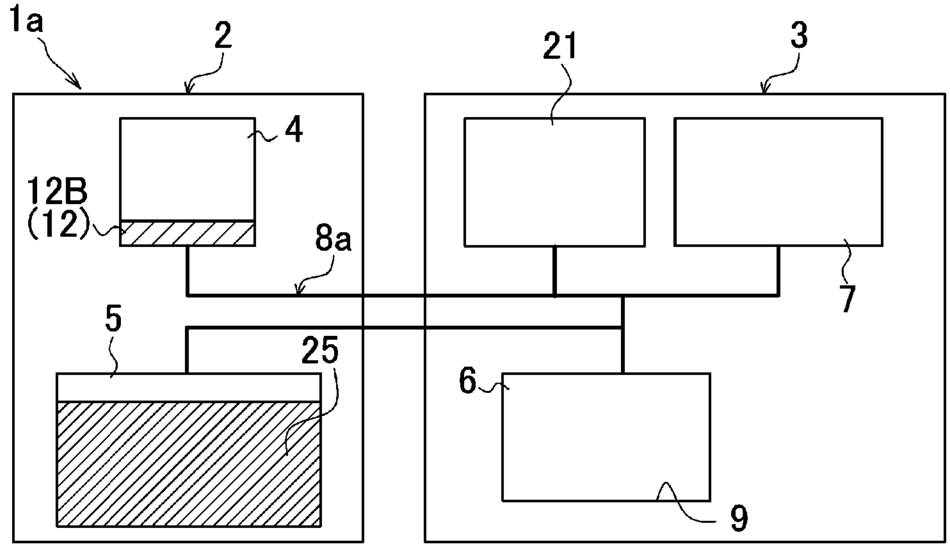

The incubator 3 is configured to be capable of maintaining a temperature of the culture area at, for example, about 37 degrees C. Thus, the cells 13 can be cultured in the incubator 3. The incubator 3 may be configured to adjust the temperature of the culture area to a temperature other than about 37 degrees C. The incubator 3 has a door (not shown) that can be opened and closed. At least a culture container 6 and a detachment liquid buffer container 7 are accommodated in the incubator 3. The culture container 6 is a container for culturing the cells 13. When the cells 13 have been cultured, the used culture medium 11 is contained in the culture container 6 and the cells 13 are sufficiently grown in the used culture medium 11. The cells 13 generally grow while adhering to an inner surface 9 (more specifically, a bottom surface) of the culture container 6. The detachment liquid buffer container 7 is a container for warming the detachment liquid 12 for detaching the cultured cells 13 from the inner surface 9 of the culture container 6. In addition, the incubator 3 may accommodate, for example, a container (not shown) for warming a culture medium (not shown). That is, for example, the incubator 3 may accommodate a culture medium buffer container 21 (see FIGS. 7A and 7B) used in a modification described later. However, detailed description is omitted here.

At least the detachment liquid storage container 4, the collection container 5, the culture container 6, and the detachment liquid buffer container 7 are connected to one another by, for example, a pipe 8 having a plurality of tubes. A liquid or a suspension (a mixture of liquid and solid) used in the cell culture system 1 can be sent (moved) from any one of the plurality of containers described above to another arbitrary container via the pipe 8. For example, a plurality of valves and one or more pumps (not shown) are provided in the middle of the pipe 8. Further, for example, a pressurizing device (not shown) is connected to the detachment liquid buffer container 7. A predetermined liquid or suspension is delivered to a predetermined container by operating the pump or the pressurizing device while keeping the plurality of valves appropriately opened and closed. The valves, the pump, and the pressurizing device may be operated by an operator. Alternatively, a control device (not shown) may be provided to control the valves, the pump, and the pressurizing device. Instead of the operator, the control device may control the valves, the pump, and the pressurizing device to move a liquid or a suspension.

Next, the culture medium will be explained. In the present embodiment, a liquid culture medium (culture medium) is used to culture the cells 13. The culture medium has nutrients necessary for the cells 13 to grow. The nutrients include, for example, inorganic salts, sugars, amino acids, vitamins, and the like. As the type of culture medium, for example, a serum culture medium containing animal-derived serum (e.g., bovine serum) may be used. However, the culture medium is not limited thereto. As the culture medium, for example, a xeno-free culture medium that contains human-derived components and does not contain non-human animal-derived components may be used. Alternatively, for example, an animal-free culture medium containing no animal-derived components may be used as the culture medium. The culture medium after the culture of the cells 13 is completed becomes a used culture medium 11.

Next, the detachment liquid 12 will be described. The detachment liquid 12 is a liquid containing a cell detachment enzyme for detaching the cells 13 adhering to the inner surface 9 of the culture container 6 from the inner surface 9. As the type of the cell detachment enzyme, for example, known trypsin may be used. However, the cell detachment enzyme is not limited thereto. The detachment liquid 12 may contain a cell detachment enzyme other than trypsin. Alternatively, the detachment liquid 12 may not necessarily contain a cell detachment enzyme, as long as it has a function of detaching the cells 13 from the inner surface 9 of the culture container 6. For example, the detachment liquid 12 may contain ethylenediaminetetraacetic acid (EDTA).

As a conventional procedure for harvesting (collecting) the cultured cells 13, for example, the following procedure may be considered. That is, when the used culture medium 11 is discharged from the culture container 6, the cells 13 remain attached to the inner surface 9 of the culture container 6. Thereafter, the detachment liquid 12 is supplied to the culture container 6. The cells 13 may be damaged by the detachment liquid 12 when they are immersed in the detachment liquid 12 for a long time. Therefore, for example, a fresh culture medium (not shown) is placed in the collection container 5 in advance. A suspension containing a mixture of detachment liquid 12 and cells 13 is sent to the collection container 5 at an appropriate timing. Thus, the suspension is mixed with the fresh culture medium. The fresh culture medium generally contains a substance that inactivates a cell detachment enzyme. For example, a serum culture medium contains an inorganic salt (such as calcium and magnesium). For example, trypsin, which is a cell detachment enzyme, is inactivated by calcium and magnesium. Thus, the detachment liquid 12 is inactivated by the culture medium. Therefore, the cells 13 are collected while suppressing the damage to the cells 13 which may otherwise be caused by the detachment liquid 12.

In recent years, culturing a large number of cells 13 using a large-scale facility has been studied. When the large number of cells 13 need to be collected, a large amount of fresh culture medium is consumed in the method of inactivating the detachment liquid 12 using the fresh culture medium as described above. For that reason, the cost may become very high. Therefore, in the first embodiment, the cells 13 are collected by the following procedure in order to suppress the increase in cost while suppressing the damage to the cells 13.

Figure 2:
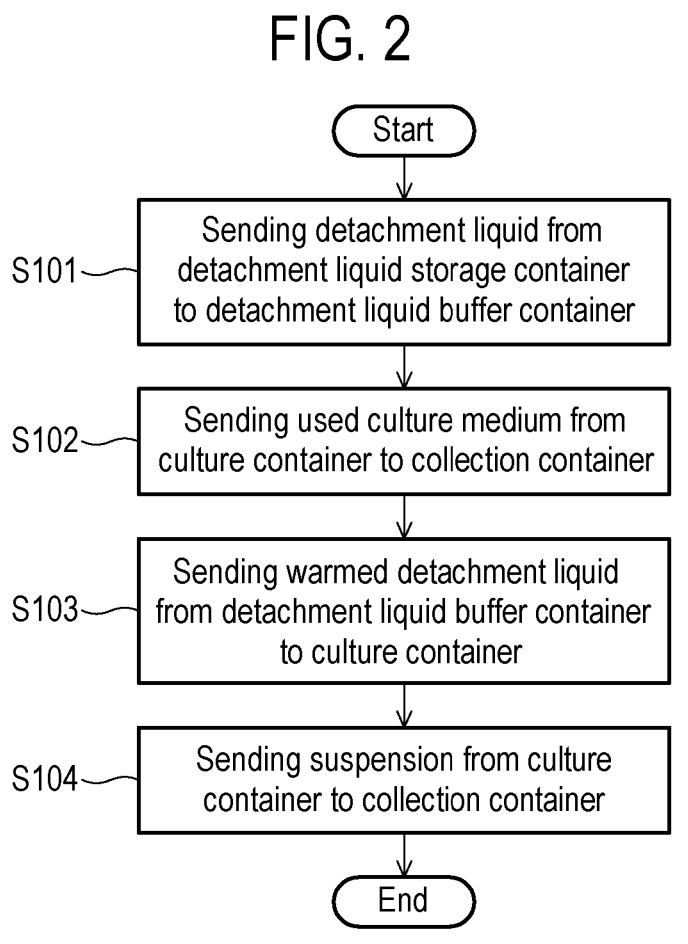

The procedure of a cell collection method of collecting the cells 13 in the cell culture system 1 will be described with reference to the flowchart of FIG. 2 and the schematic diagrams of FIGS. 3A to 4B. In the following, for sake of convenience of explanation, it is assumed that an operator performs works. An operator operates the valves, the pumps, and the pressurizing devices (not shown) described above to send (move) various liquids or suspensions from one container to another container. Instead of the operator, a control device (not shown) may control the valves, the pumps, and the pressurizing devices.

Figure 3A:
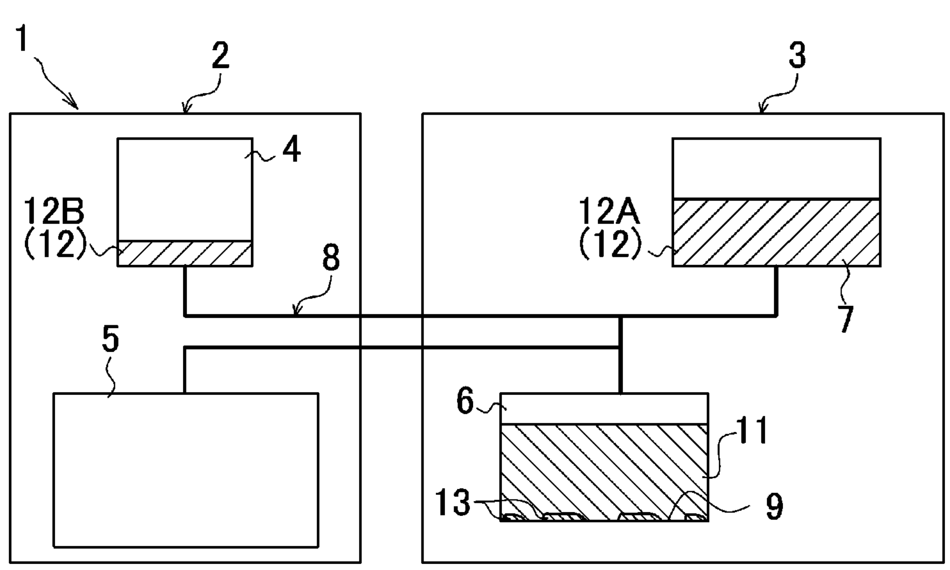
FIGS. 3A and 3B are explanatory diagrams showing parts of the procedure of the cell collection method.

First, after culturing the cells 13 is completed (after the cells 13 in the culture container 6 have grown sufficiently), the operator sends the detachment liquid 12 from the detachment liquid storage container 4 to the detachment liquid buffer container 7 (step S101). For example, as shown in FIG. 3A, a part of the detachment liquid 12 (detachment liquid 12A) in the detachment liquid storage container 4 may be sent to the detachment liquid buffer container 7. The detachment liquid 12A is warmed in the incubator 3. Another part of the detachment liquid 12 (detachment liquid 12B) remains in the detachment liquid storage container 4.

Figure 3B:
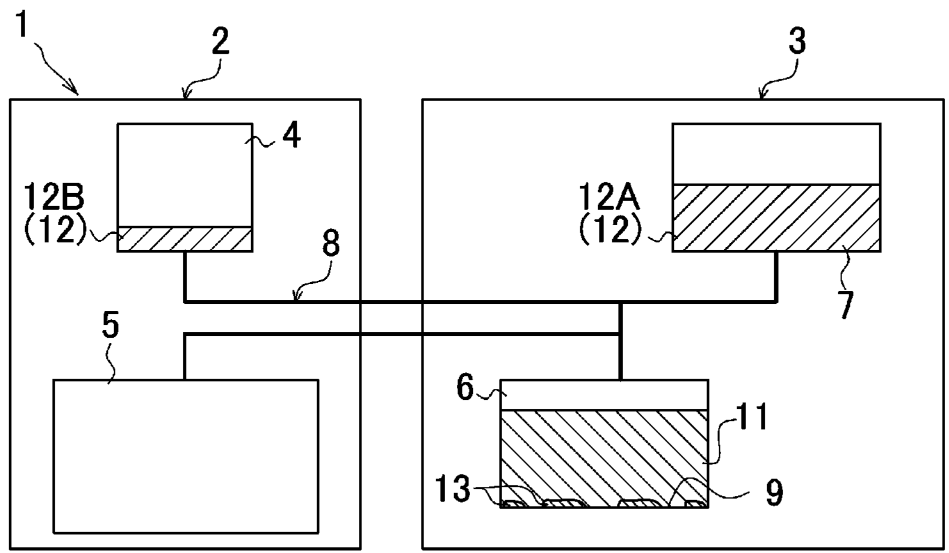
Figure 4A:
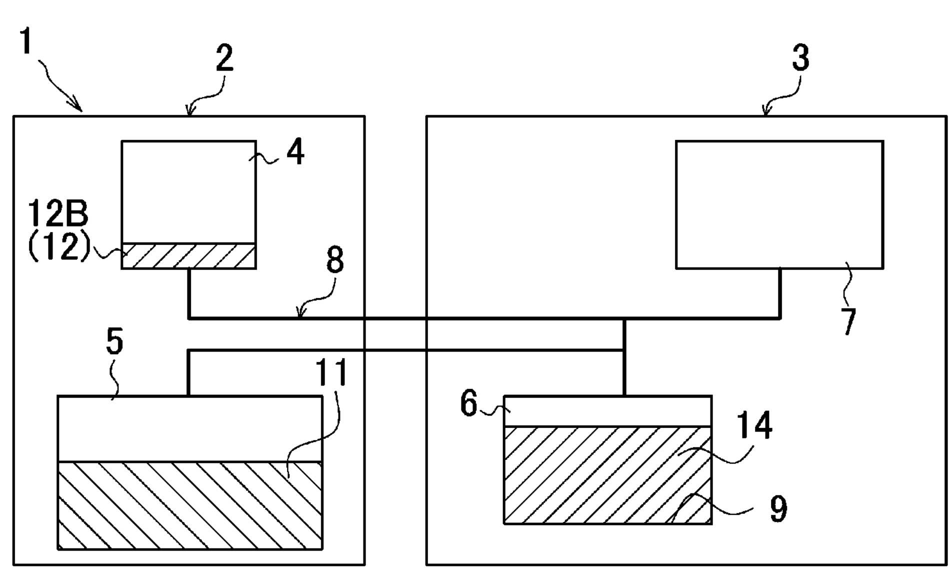
FIGS. 4A and 4B are explanatory diagrams showing parts of the procedure of the cell collection method.
Figure 4B:
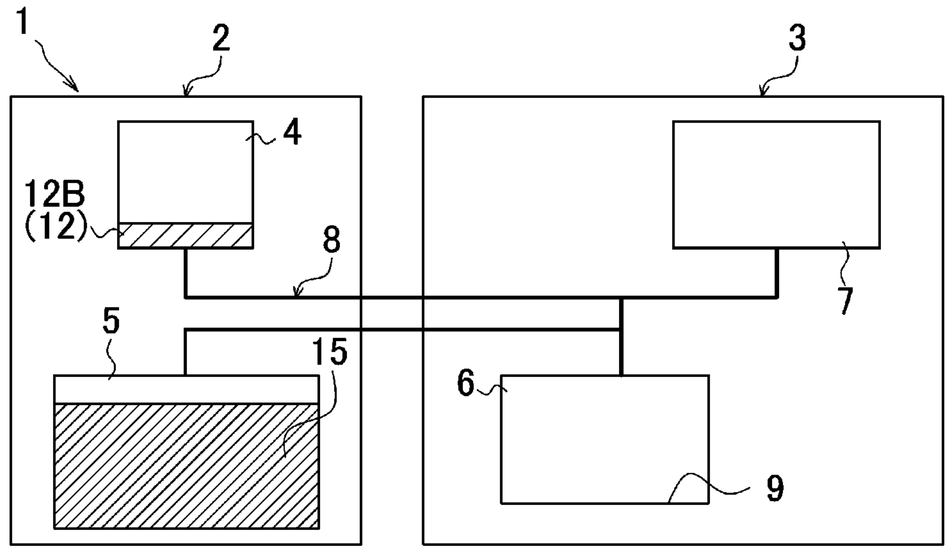

Subsequently, the operator sends the used culture medium 11 from the culture container 6 to the collection container 5 (step S102) (a culture medium movement process) (see FIG. 3B). A temperature in a space (low temperature area) in which the collection container 5 is disposed is maintained to be lower than a temperature in a space (culture area) in which the culture container 6 is disposed. Therefore, the used culture medium 11 is cooled in the refrigerator 2. The cells 13 remain in the culture container 6 while adhering to the inner surface 9.

Subsequently, the operator sends the warm detachment liquid 12A from the detachment liquid buffer container 7 to the culture container 6 (step S103) (a detachment liquid supply process). Thereafter, by waiting for a predetermined period of time, the cells 13 are detached from the inner surface 9 of the culture container 6 by the detachment liquid 12A. As a result, the detachment liquid 12A and the cells 13 are mixed to form a suspension 14 (see FIG. 4A).

Finally, the operator sends the suspension 14 from the culture container 6 to the collection container 5 (step S104) (a mixing process). As a result, the suspension 14 (the detachment liquid 12A and the cells 13) and the used culture medium 11 are mixed to form a suspension 15 (see FIG. 4B). Therefore, the detachment liquid 12A is diluted by the used culture medium 11. Furthermore, the present inventors have found the following fact. That is, in the used culture medium 11, most of the nutrients other than an inorganic salt are absorbed by the cells 13 and hardly remain. However, the inorganic salt remains in the used culture medium 11 to some extent. Therefore, the detachment liquid 12A can be inactivated by the inorganic salt. Accordingly, the used culture medium 11 can effectively suppress the damage to the cells 13 which may be caused by the detachment liquid 12A.

Thereafter, the cells 13 can be harvested by separating the suspension 15 into the cells 13 and other substances (a concentration process) through the use of, for example, a centrifuge (not shown).

As described above, the used culture medium 11 used for culturing the cells 13 can at least dilute the detachment liquid 12A. Moreover, when the used culture medium 11 contains a component that inactivates the detachment liquid 12A, it is possible to inactivate the detachment liquid 12A. Thus, the damage to the cells caused by the detachment liquid 12A can be suppressed without having to use a fresh culture medium. Therefore, when detaching and collecting the cultured cells 13 from the culture container 6 by the detachment liquid 12A, it is possible to suppress the increase in cost while suppressing the damage to the cells 13.

Further, in the mixing process, the suspension 14 in which the detachment liquid 12A and the cells 13 are mixed is moved from the culture container 6 to the collection container 5. That is, the mixing process also serves as a process of moving the cells 13 to the collection container 5 (i.e., a collection process). Therefore, as compared with a case where the used culture medium 11 is moved from the collection container 5 to the culture container 6 in the mixing process, it is possible to suppress an increase in the number of processes.

In addition, a temperature in the collection container 5 accommodated in the refrigerator 2 can be maintained to be lower than a temperature in the culture container 6 accommodated in the incubator 3. Therefore, as compared with a case where the temperature in the collection container 5 is high, it is possible to suppress deterioration of the cells 13 collected in the collection container 5 and to preserve the cells 13 for a long time.

Next, modifications of the first embodiment will be described. Components having the same configuration as in the first embodiment are designated by the same reference numerals, and the description thereof will be omitted as appropriate.

Figure 5:
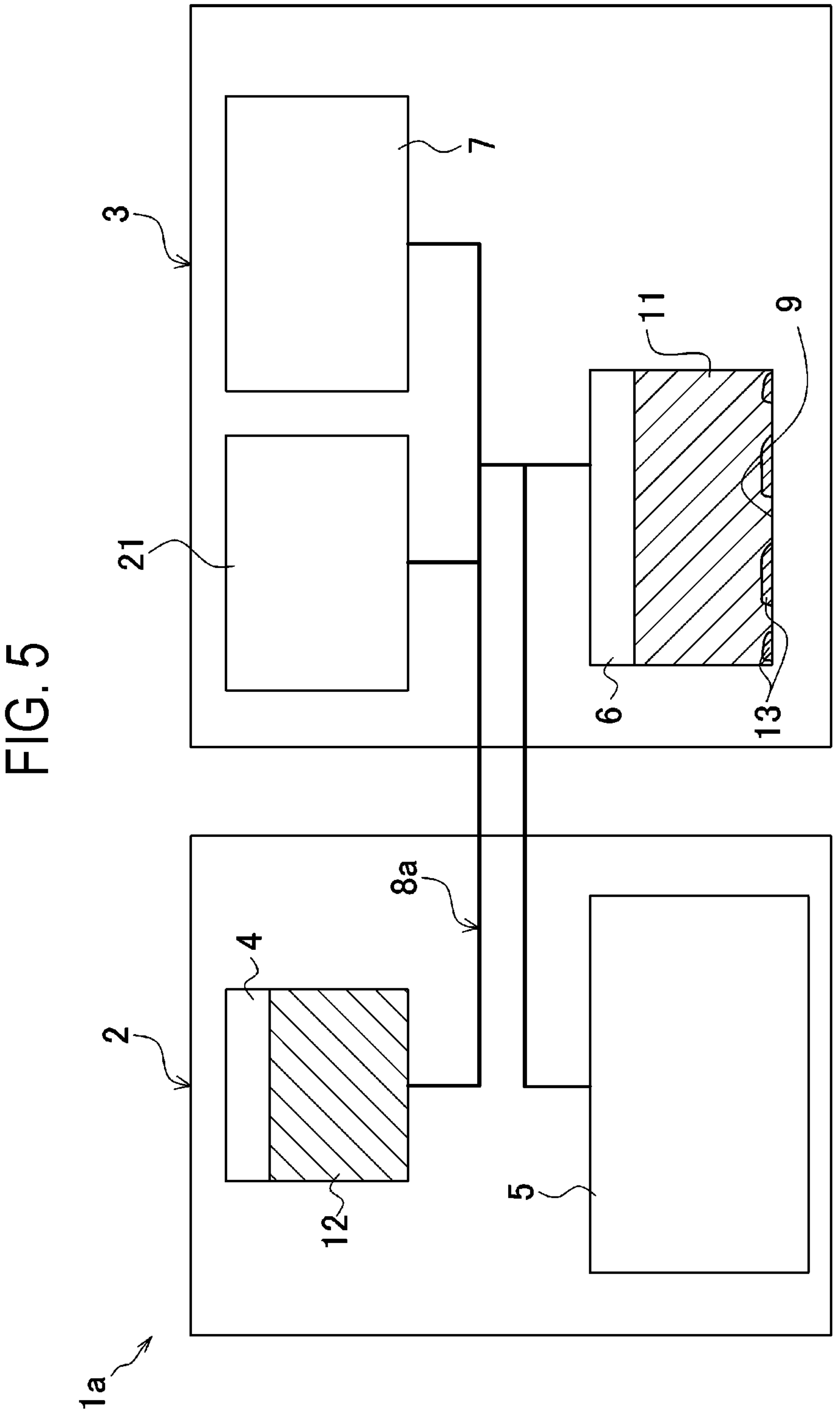
FIG. 5 is a schematic diagram showing a cell culture system according to a modification of the first embodiment.

(1) In the first embodiment, the used culture medium 11 is entirely sent from the culture container 6 to the collection container 5 in the culture medium movement process. However, the present disclosure is not limited thereto. A specific description will be given below. For example, as shown in FIG. 5, a cell culture system 1*a* may include a culture medium buffer container 21 (a second reservoir of the present disclosure), in addition to the detachment liquid storage container 4, the collection container 5 (a first reservoir of the present disclosure), the culture container 6, and the detachment liquid buffer container 7. The culture medium buffer container 21 is accommodated in the incubator 3, for example. The detachment liquid storage container 4, the collection container 5, the culture container 6, the detachment liquid buffer container 7, and the culture medium buffer container 21 are connected to one another by a pipe 8*a*.

Figure 6:
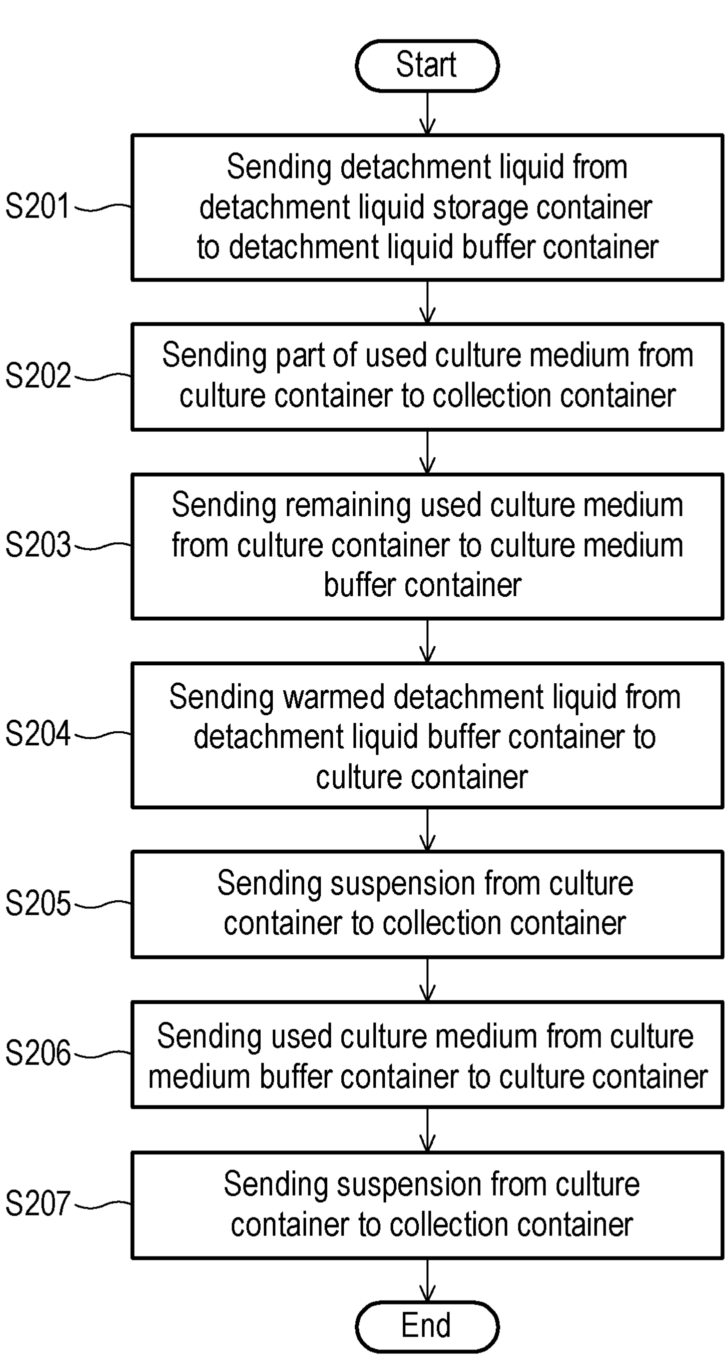
FIG. 6 is a flowchart showing a procedure of the cell collection method.

The procedure of a cell collection method in the cell culture system 1*a* will be described with reference to the flowchart of FIG. 6 and the schematic diagrams of FIGS. 7A to 9B. First, after culturing the cells 13 is completed, the operator sends the detachment liquid 12A from the detachment liquid storage container 4 to the detachment liquid buffer container 7 (step S201) (see FIG. 7A). Subsequently, as a part of the culture medium movement process, the operator sends a part of the used culture medium 11 (a used culture medium 11A; a first used culture medium of the present disclosure) from the culture container 6 to the collection container 5 (step S202) (a first culture medium movement process) (see FIG. 7B). Furthermore, as a part of the culture medium movement process, the operator sends the remaining used culture medium 11B (a second used culture medium of the present disclosure) from the culture container 6 to the culture medium buffer container 21 (step S203) (a second culture medium movement process) (see FIG. 7B). The used culture medium 11B is a part of the used culture medium 11 different from the used culture medium 11A. The order of steps S202 and S203 may be changed. Thereafter, the operator sends the warm detachment liquid 12A from the detachment liquid buffer container 7 to the culture container 6 (step S204) (a detachment liquid supply process). Thereafter, by waiting for a predetermined period of time, the cells 13 are detached from the inner surface 9 of the culture container 6 by the detachment liquid 12A. As a result, the detachment liquid 12A and the cells 13 are mixed to form a suspension 22 (see FIG. 8A). Thereafter, the operator sends the suspension 22 from the culture container 6 to the collection container 5 (step S205) (a mixing process). As a result, the suspension 22 (the detachment liquid 12A and the cells 13) and the used culture medium 11A are mixed to form a suspension 23 (see FIG. 8B). It is most desirable that all the cells 13 in the suspension 22 flow out of the culture container 6 in step S205. However, in actual, some cells 13 may remain in the culture container 6 without flowing out (see cells 13A in FIGS. 8A and 8B). Therefore, subsequently, the operator sends the used culture medium 11B from the culture medium buffer container 21 to the culture container 6 (step S206) (a return process). As a result, the cells 13A and the used culture medium 11B can be mixed to form a suspension 24 (see FIG. 9A), and the cells 13A contained in the suspension 24 can be collected. Finally, the operator sends the suspension 24 from the culture container 6 to the collection container 5 (step S207). As a result, the suspension 23 and the suspension 24 are mixed to form a suspension 25 (see FIG. 9B). As described above, some of the cells 13A remaining in the culture container 6 can be mixed with the used culture medium 11B returned to the culture container 6 in the return process. Thus, the cells 13A can be collected together with the used culture medium 11B. Therefore, it is possible to improve a collection rate of the cells 13 while suppressing an increase in cost.

(2) In the above-described embodiments, the suspension (the suspension 14 or the suspension 22) of the detachment liquid 12A and the cells 13 is sent from culture container 6 to the collection container 5 in the mixing process. However, the present disclosure is not limited thereto. The operator may send the used culture medium 11 from the collection container 5 to the culture container 6 in the mixing process. Such an operation can dilute and inactivate the detachment liquid 12A. In this case, in order to collect the cells 13, it is necessary to finally send the suspension (not shown) containing the cells 13 from the culture container 6 to the collection container 5, which leads to an increase in the number of processes.

Figure 10:
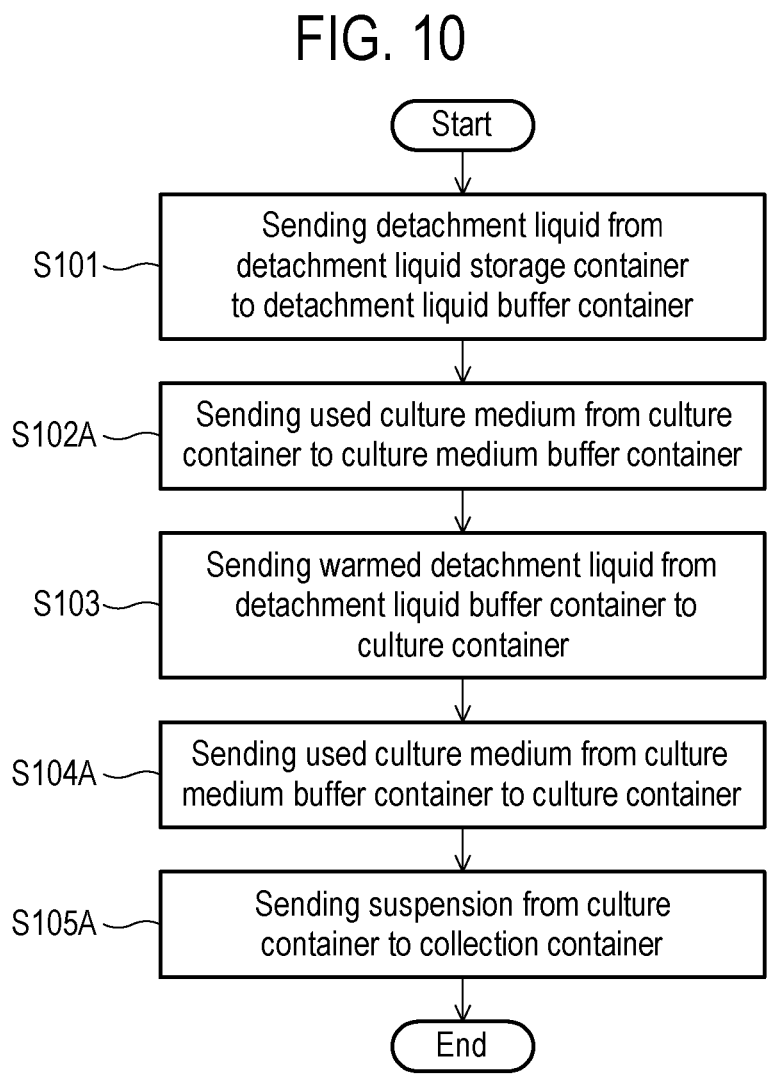

(3) As another modification of the configuration shown in FIG. 5, in the cell culture system 1*a*, the cell collection method may be performed in the following procedure similar to the procedure (steps S101 to S104 described above) shown in the first embodiment. Description will be made below with reference to the flowchart of FIG. 10. After executing step S101, instead of step S102 (the process of sending the used culture medium 11 from the culture container 6 to the collection container 5), the operator may perform, for example, a process (step S102A) of sending an entirety of the used culture medium 11 from the culture container 6 to the culture medium buffer container 21. In this case, the culture medium buffer container 21 corresponds to the reservoir of the present disclosure. Furthermore, after executing step S103, instead of step S104 (the process of sending the suspension 14 from the culture container 6 to the collection container 5), the operator may perform a process (step S104A) of returning the used culture medium 11 from the culture medium buffer container 21 to the culture container 6 (step S104A) (corresponding to the mixing process of the present disclosure). Thereafter, the operator may execute a process (step S105A) of sending the entire suspension (not shown) in the culture container 6 to the collection container 5.

Alternatively, in this modification, instead of step S104A, the operator may execute a process of sending the suspension 14 from the culture container 6 to the culture medium buffer container 21 (corresponding to the mixing process of the present disclosure). Thereafter, instead of step S105A, the operator may execute a process of sending the entire suspension (not shown) in the culture medium buffer container 21 to the collection container 5.

Second Embodiment

Next, a second embodiment of the present disclosure will be described. Components having the same configuration as in the first embodiment are designated by the same reference numerals, and the description thereof will be omitted as appropriate.

In the mixing process of the first embodiment, an entirety of the detachment liquid 12A sent to the culture container 6 and the used culture medium 11 are mixed with each other. In the second embodiment, a part of the detachment liquid 12A and the used culture medium 11 are mixed with each other in a mixing process to be described later. That is, considering both the first embodiment and the second embodiment, at least a part of the detachment liquid 12A and the used culture medium 11 are mixed with each other in the mixing process.

Figure 11:
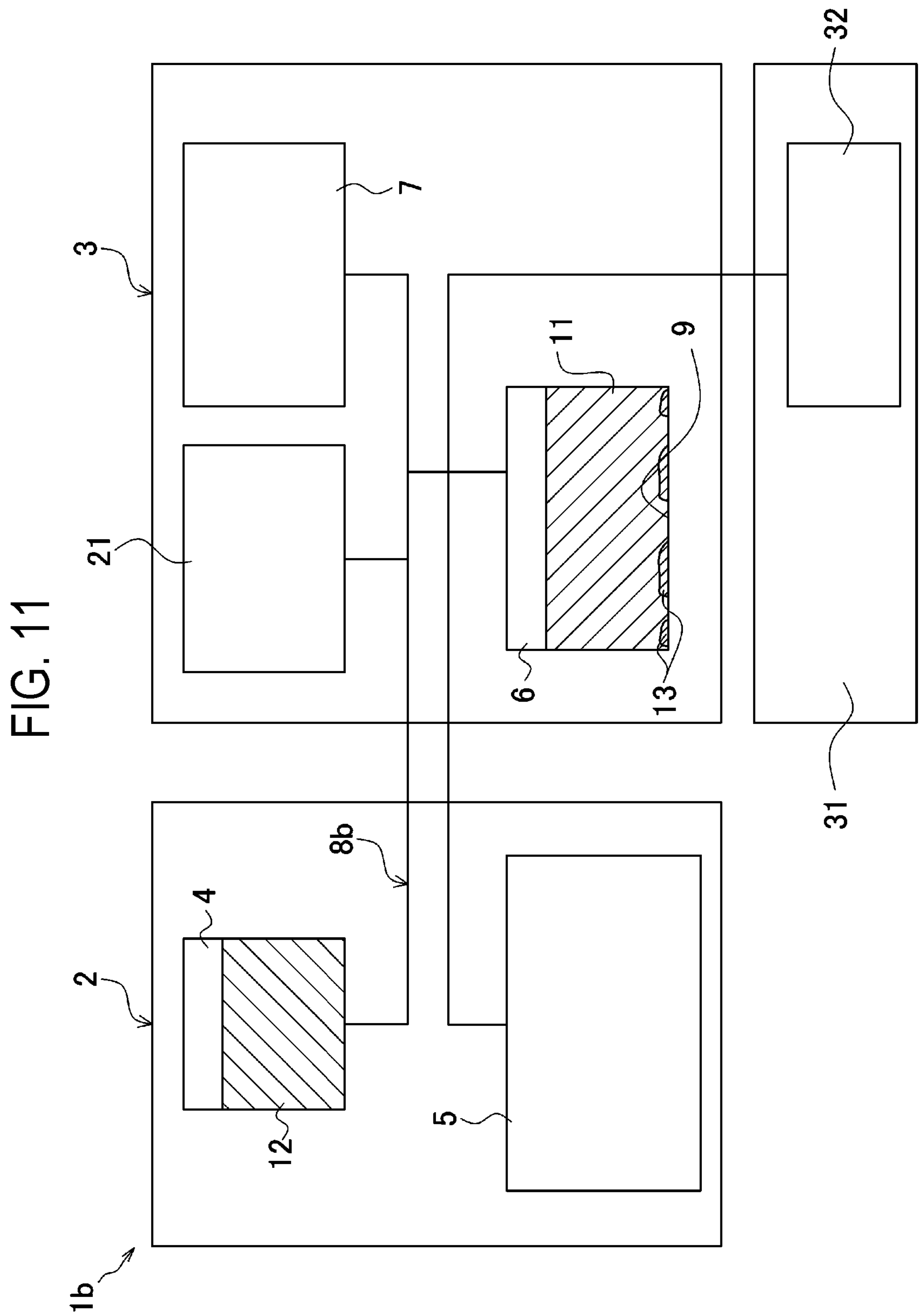
FIG. 11 is a schematic diagram showing a cell culture system according to a second embodiment.

For example, the iPSCs described above are generally more likely to be damaged by the detachment liquid 12 than the MSCs described above. Therefore, a cell collection method described below is particularly effective when collecting the iPSCs. As shown in FIG. 11, a cell culture system 1*b* includes a drainage container 32 disposed in a room temperature area 31, in addition to the detachment liquid storage container 4, the collection container 5, the culture container 6, the detachment liquid buffer container 7, and the culture medium buffer container 21. The detachment liquid storage container 4, the collection container 5, the culture container 6, the detachment liquid buffer container 7, the culture medium buffer container 21, and the drainage container 32 are connected to one another by a pipe 8*b*.

Figure 12:
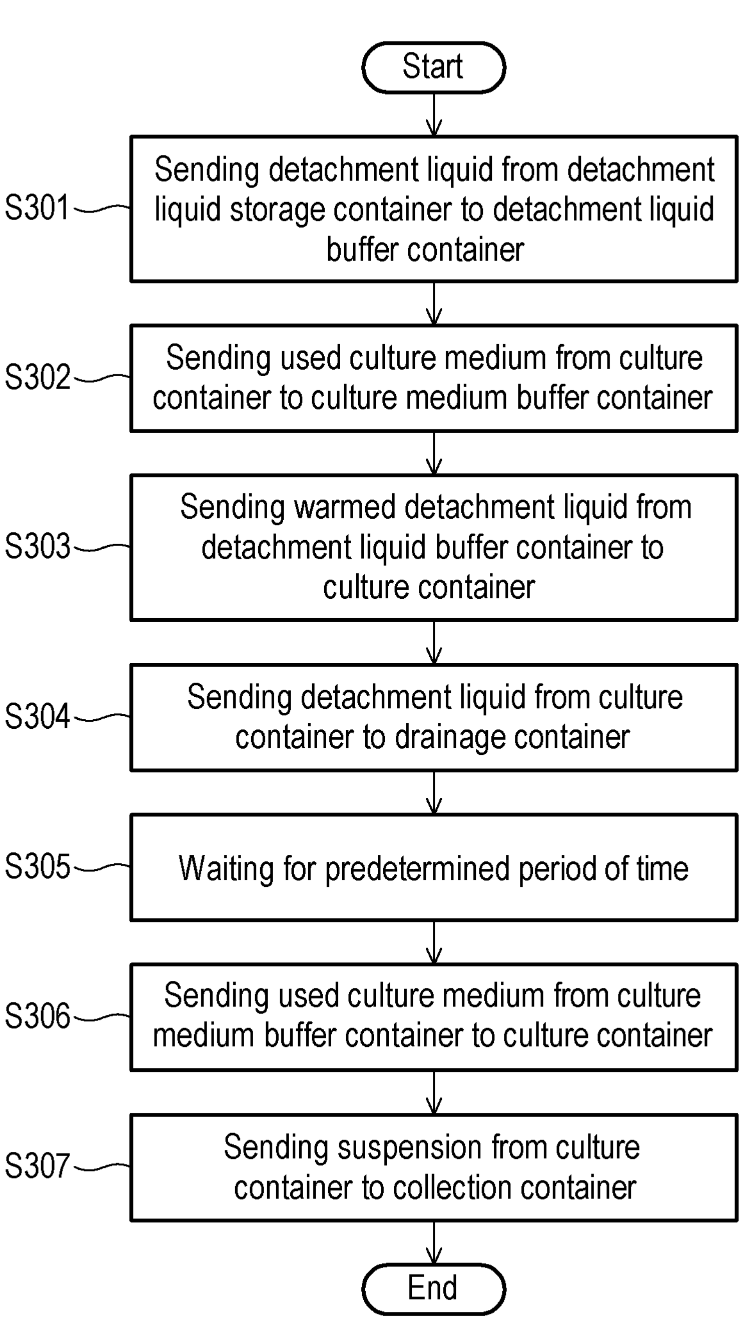
FIG. 12 is a flowchart showing a procedure of a cell collection method.

The procedure of a cell collection method in the cell culture system 1*b* will be described with reference to the flow chart of FIG. 12 and the schematic diagrams of FIGS. 13A to 15B.

Figure 13A:
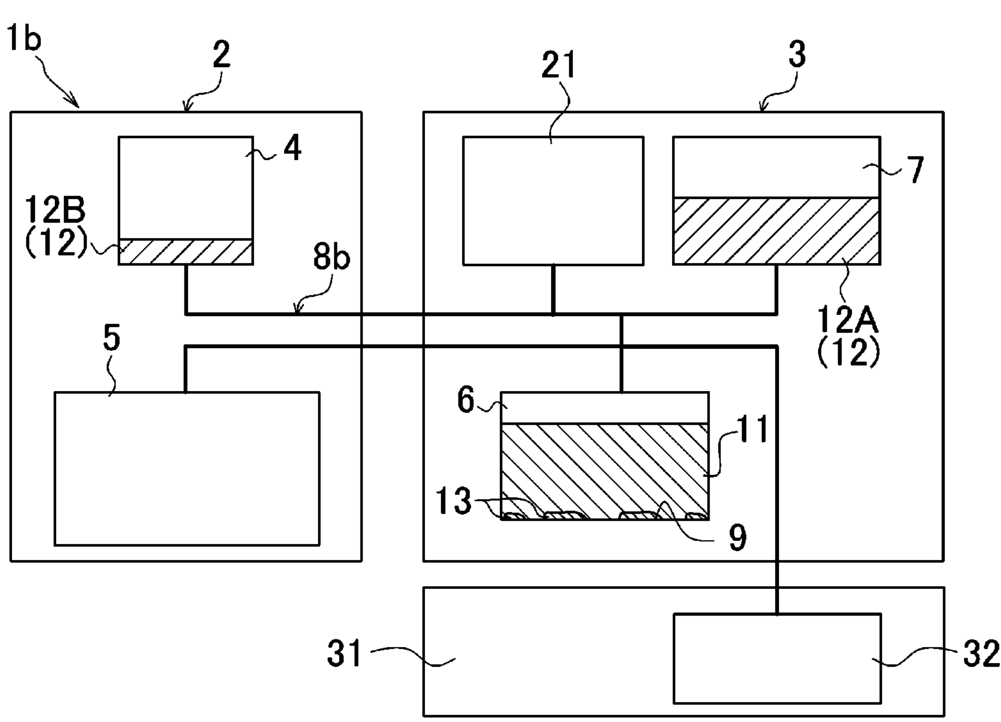
FIGS. 13A and 13B are explanatory diagrams showing parts of the procedure of the cell collection method.
Figure 13B:
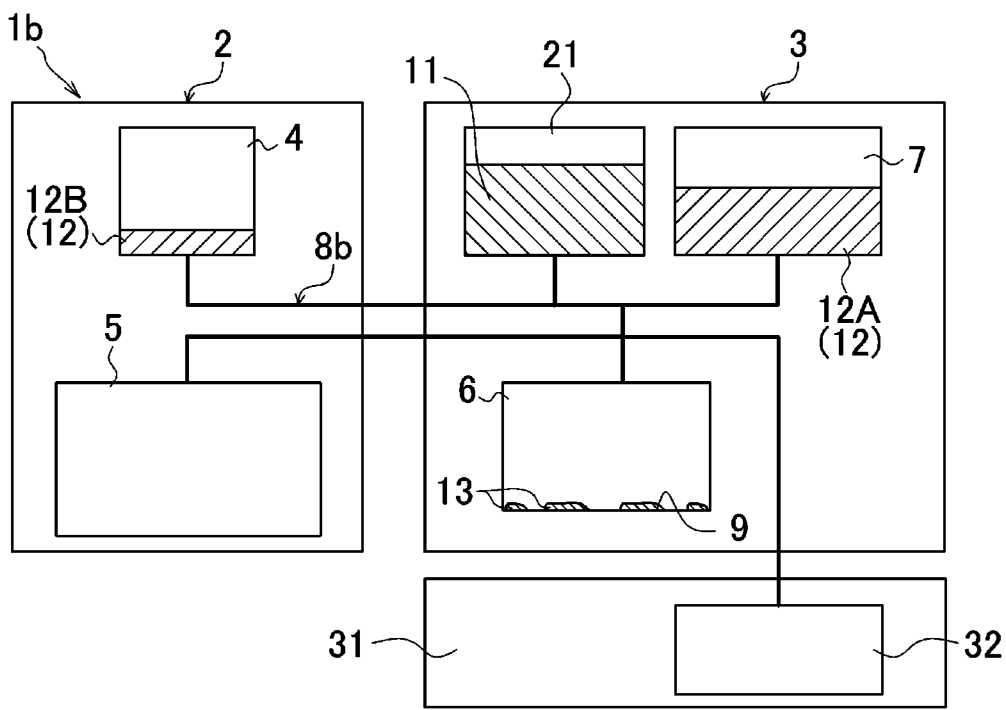

First, after culturing the cells 13 is completed, the operator sends the detachment liquid 12A from the detachment liquid storage container 4 to the detachment liquid buffer container 7 (step S301) (see FIG. 13A). Subsequently, the operator sends the used culture medium 11 from the culture container 6 to the culture medium buffer container 21 (step S302) (a culture medium movement process) (see FIG. 13B). In the second embodiment, the culture medium buffer container 21 corresponds to the reservoir of the present disclosure. Subsequently, the operator sends the warm detachment liquid 12A from the detachment liquid buffer container 7 to the culture container 6 (step S303) (a detachment liquid supply process) (see FIG. 14A).

Figure 14A:
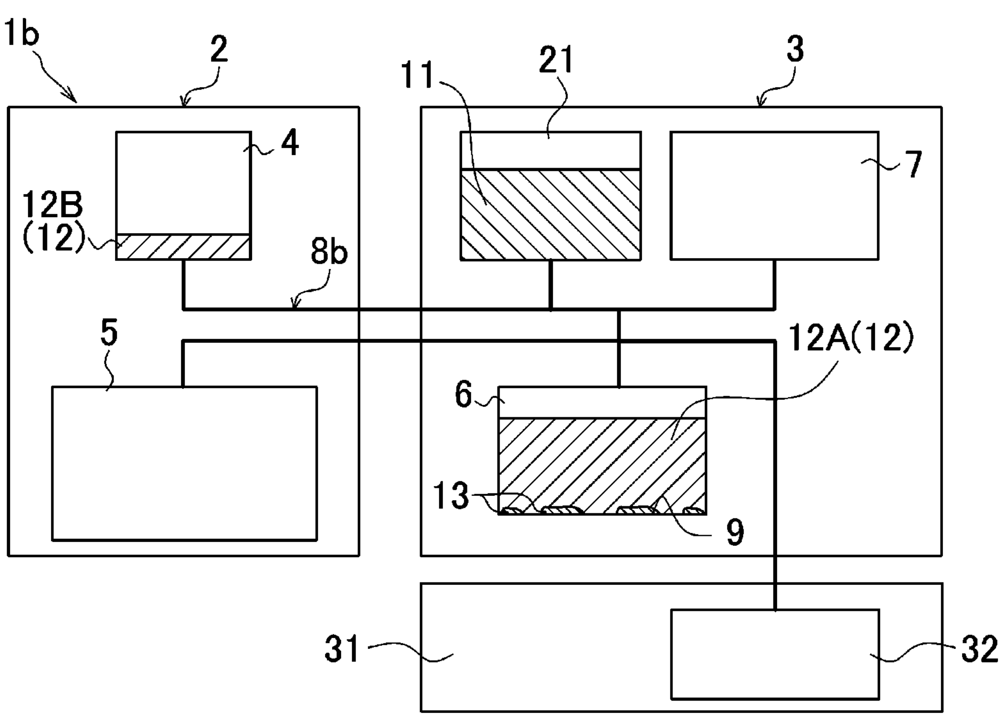
FIGS. 14A and 14B are explanatory diagrams showing parts of the procedure of the cell collection method.
Figure 14B:
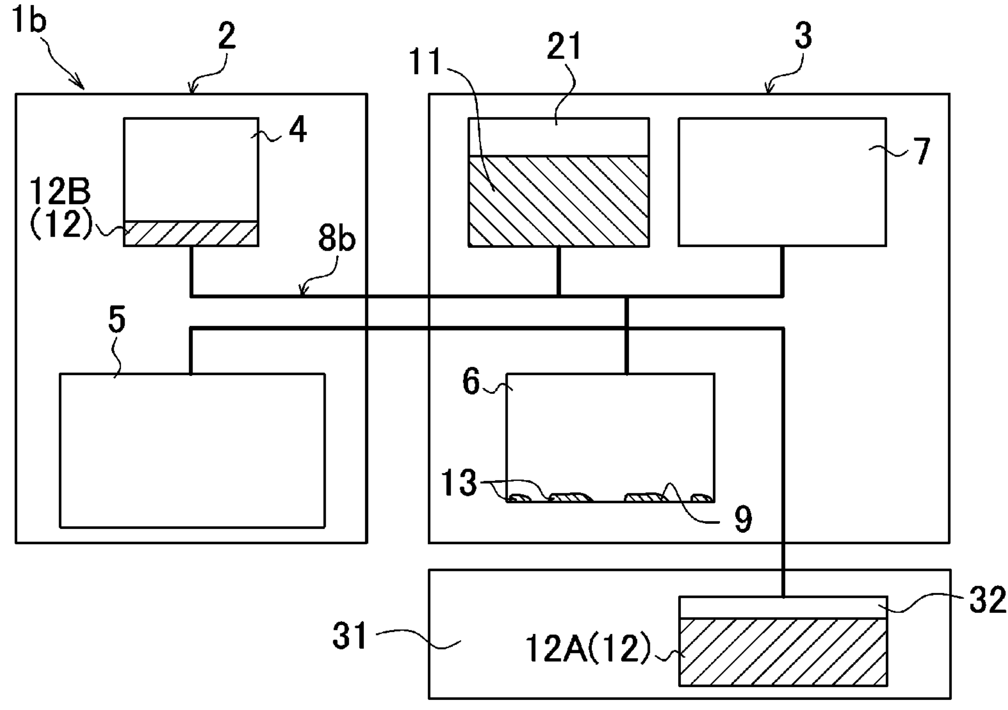
Figure 15A:
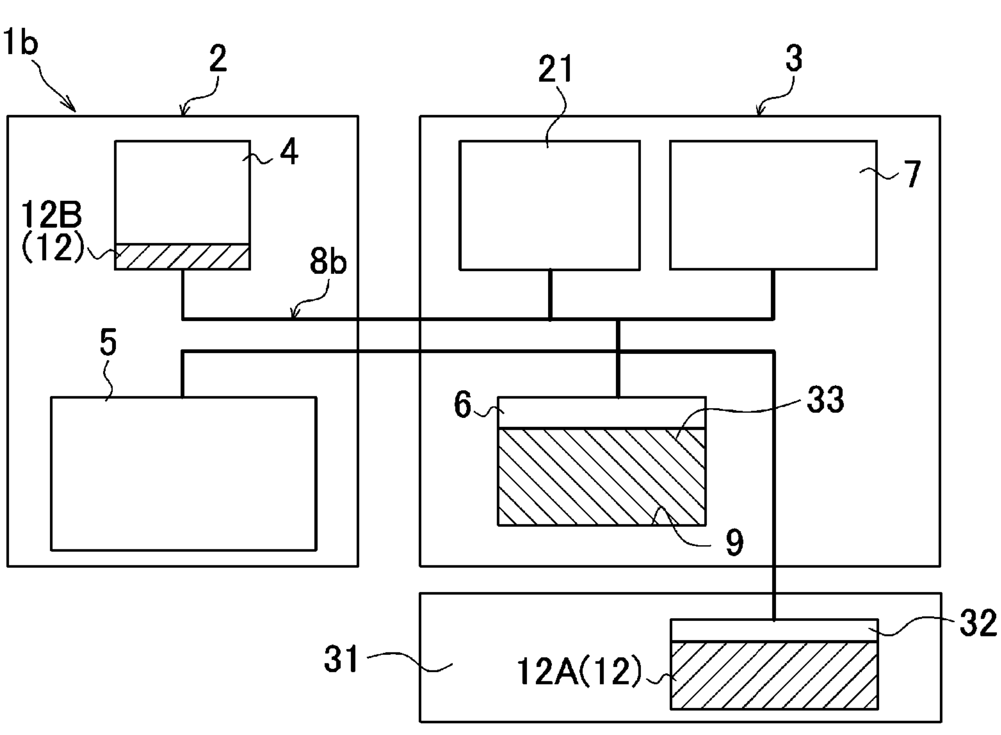
FIGS. 15A and 15B are explanatory diagrams showing parts of the procedure of the cell collection method.
Figure 15B:
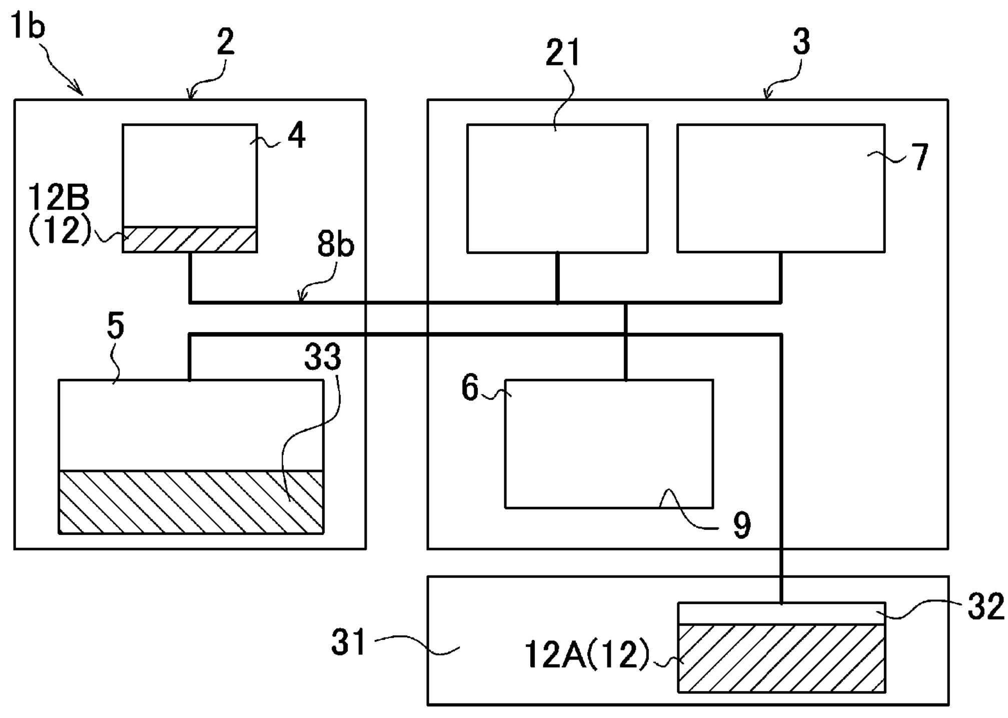

Then, after waiting for a certain period of time and before the cells 13 are completely detached from the inner surface 9 of the culture container 6, the operator discharges the detachment liquid 12A from the culture container 6 and sends the detachment liquid 12A to the drainage container 32 (step S304) (a detachment liquid discharge process) (see FIG. 14B). At this time, the cells 13 adhere to the inner surface 9 of the culture container 6. Therefore, the cells 13 remain in the culture container 6 without being discharged together with the detachment liquid 12A. In addition, a part of the detachment liquid 12A remains in the culture container 6, for example, in a state in which the detachment liquid 12A adheres to the cells 13. Thereafter, the operator waits for a predetermined period of time (step S305) (a waiting process). As a result, the cells 13 can be completely detached from the inner surface 9 of the culture container 6 by the part of the detachment liquid 12A slightly remaining in the culture container 6. In such a method, as compared with a case where the cells 13 are immersed in the detachment liquid 12A until the cells 13 are completely detached from the inner surface 9 of the culture container 6, the damage to the cells 13 by the detachment liquid 12A can be suppressed as much as possible. Subsequently, the operator sends the used culture medium 11 from the culture medium buffer container 21 to the culture container 6 (step S306) (a mixing process). As described above, the detachment liquid discharge process and the waiting process are provided between the detachment liquid supply process and the mixing process.

By moving the used culture medium 11 to the culture container 6 in the mixing process, the cells 13 can be suspended in the used culture medium 11 in the culture container 6. As a result, the used culture medium 11 and the cells 13 are mixed to form a suspension 33 (see FIG. 15A). In addition, since a part of the detachment liquid 12A remaining in the culture container 6 is mixed with the used culture medium 11, the part of the detachment liquid 12A can be diluted and inactivated by the used culture medium 11. Finally, the operator sends the suspension 33 from the culture container 6 to the collection container 5 (step S307) (see FIG. 15B). As described above, even when the cells 13 are ones that can be easily damaged by the detachment liquid 12A, the cells 13 can be collected while suppressing the damage of the cells 13 as much as possible.

Next, a modification of the second embodiment will be described. Components having the same configuration as in the second embodiment are designated by the same reference numerals, and the description thereof will be omitted as appropriate.

(1) In the second embodiment, the entirety of the used culture medium 11 is sent from the culture medium buffer container 21 to the culture container 6 in the mixing process. However, the present disclosure is not limited thereto. For example, in the mixing process, a part of the used culture medium 11 may be sent from the culture medium buffer container 21 to the culture container 6. Thereafter, a suspension (not shown) of the part of the used culture medium 11 and the cells 13 may be sent from the culture container 6 to the collection container 5. Thereafter, the remaining used culture medium 11 may be further sent from the culture medium buffer container 21 to the culture container 6. Thereafter, a suspension (not shown) of the remaining used culture medium 11 and a part of the cells 13 that may remain in the culture container 6 may be sent from the culture container 6 to the collection container 5.

Next, modifications common to the first and second embodiments will be described. Components having the same configuration as in the first or second embodiment are designated by the same reference numerals, and the description thereof will be omitted as appropriate.

(1) In the first and second embodiments, when collecting the cells 13, the detachment liquid 12A is sent to and warmed in the detachment liquid buffer container 7. However, the present disclosure is not limited thereto. For example, the detachment liquid 12 may be warmed in advance during the culture of the cells 13 (at a timing before the collection of the cells 13 is started).

(2) In the first and second embodiments, the collection container 5 is accommodated in the refrigerator 2. However, the present disclosure is not limited thereto. For example, when the cells 13 sent to the collection container 5 are quickly harvested through the concentration process, the collection container 5 may be disposed at another location. In this case, the collection container 5 may be accommodated in the incubator 3, for example. Alternatively, the collection container 5 may be disposed in a space outside the refrigerator 2 and the incubator 3 (e.g., the room temperature area 31).

(3) The used culture medium 11 does not necessarily contain the component for inactivating the detachment liquid 12. That is, the used culture medium 11 may be used to merely dilute at least a part of the detachment liquid 12 used to detach the cells 13 from the inner surface 9 of the culture container 6. Even in such a case, the damage to the cells 13 by the detachment liquid 12 can be suppressed without having to use a fresh culture medium.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cell detaching method of detaching cells having been cultured in a culture container containing a liquid culture medium and adhered to an inner surface of the culture container, the method comprising:

a culturing process of culturing the cells in the container by using the culture medium;

a culture medium movement process of moving the used culture medium in the culture container to a reservoir after the cells are cultured;

a detachment liquid supply process of, after the culture medium movement process, supplying a detachment liquid for detaching the cells from the inner surface of the culture container to the culture container; and a mixing process of, after the detachment liquid supply process, moving a suspension in which at least a part of the detachment liquid and the cells are mixed from the culture container to the reservoir and mixing the suspension and the used culture medium in the reservoir.

2. The cell detaching method of claim 1, wherein the reservoir includes a collection container for collecting the cells, and wherein in the mixing process, the suspension in which the at least the part of the detachment liquid and the cells are mixed is moved from the culture container to the collection container.

3. The cell detaching method of claim 2, wherein the reservoir includes a first reservoir and a second reservoir different from the first reservoir, wherein the culture medium movement process includes:

a first culture medium movement process of moving a first part of the used culture medium, from the culture container to the first reservoir; and a second culture medium movement process of moving a second part of the used culture medium different from the first part of the used culture medium, from the culture container to the second reservoir, wherein in the mixing process, the suspension in which the at least the part of the detachment liquid and the cells are mixed is moved from the culture container to the first reservoir, and wherein after the mixing process, a return process of moving the second part of the used culture medium from the second reservoir to the culture container is performed.

4. The cell detaching method of claim 3, wherein a temperature of the collection container is maintained to be lower than a temperature of the culture container.

5. The cell detaching method of claim 4, wherein a temperature of the collection container is maintained to be lower than a temperature of the culture container.

6. The cell detaching method of claim 1, further comprising, between the detachment liquid supply process and the mixing process:

a detachment liquid discharge process of discharging a part of the detachment liquid from the culture container before the cells are completely detached from the inner surface of the culture container; and a waiting process of waiting for a period of time after the detachment liquid discharge process in a state in which another part of the detachment liquid remains in the culture container, and wherein in the mixing process, the used culture medium is moved from the reservoir to the culture container.

7. The cell detaching method of claim 6, wherein the reservoir includes a collection container for collecting the cells, and wherein a temperature of the collection container is maintained to be lower than a temperature of the culture container.

8. The cell detaching method of claim 1, wherein the reservoir includes a collection container for collecting the cells, and wherein a temperature of the collection container is maintained to be lower than a temperature of the culture container.

9. A cell detaching method of detaching cells having been cultured in a culture container containing a liquid culture medium and adhered to an inner surface of the culture container, the method comprising:

a culturing process of culturing the cells in the container by using the culture medium;

a culture medium movement process of moving the used culture medium in the culture container to a reservoir after the cells are cultured;

a detachment liquid supply process of, after the culture medium movement process, supplying a detachment liquid for detaching the cells from the inner surface of the culture container to the culture container; and a mixing process of, after the detachment liquid supply process, moving a suspension in which at least a part of the detachment liquid and the cells are mixed from the culture container to the reservoir and mixing the suspension and the used culture medium in the reservoir, wherein the reservoir includes a first reservoir and a second reservoir different from the first reservoir, wherein the culture medium movement process includes:

a first culture medium movement process of moving a first part of the used culture medium, from the culture container to the first reservoir; and a second culture medium movement process of moving a second part of the used culture medium different from the first part of the used culture medium, from the culture container to the second reservoir, wherein in the mixing process, the suspension in which the at least the part of the detachment liquid and the cells are mixed is moved from the culture container to the first reservoir, and wherein after the mixing process, a return process of moving the second part of the used culture medium from the second reservoir to the culture container is performed.

10. The cell detaching method of claim 9, wherein the first reservoir includes a collection container for collecting the cells, and wherein in the mixing process, the suspension in which the at least the part of the detachment liquid and the cells are mixed is moved from the culture container to the collection container.

11. The cell detaching method of claim 9, further comprising, between the detachment liquid supply process and the mixing process:

a detachment liquid discharge process of discharging a part of the detachment liquid from the culture container before the cells are completely detached from the inner surface of the culture container; and a waiting process of waiting for a period of time after the detachment liquid discharge process in a state in which another part of the detachment liquid remains in the culture container, and wherein in the mixing process, the used culture medium is moved from the first reservoir to the culture container.

12. The cell detaching method of claim 9, wherein the first reservoir includes a collection container for collecting the cells, and wherein a temperature of the collection container is maintained to be lower than a temperature of the culture container.

* * * * *